(12) United States Patent
Bartholomä et al.

(10) Patent No.: US 7,338,087 B2
(45) Date of Patent: Mar. 4, 2008

(54) CONNECTOR FITTING

(75) Inventors: Mario Bartholomä, Winden (DE); Fritz Zügel, Winden (DE); Volker Götz, Kenzingen (DE); Philipp Gerber, Gutach-Bleibach (DE)

(73) Assignee: Anton Hummel Verwaltungs GmbH, Waldkirch (DE)

( * ) Notice: Subject to any disclaimer, the term of this patent is extended or adjusted under 35 U.S.C. 154(b) by 241 days.

(21) Appl. No.: 10/510,419

(22) PCT Filed: May 7, 2003

(86) PCT No.: PCT/EP03/04781

§ 371 (c)(1),
(2), (4) Date: Oct. 6, 2004

(87) PCT Pub. No.: WO2004/015320

PCT Pub. Date: Feb. 19, 2004

(65) Prior Publication Data

US 2005/0184520 A1    Aug. 25, 2005

(30) Foreign Application Priority Data

Jul. 27, 2002    (DE) .......................... 202 11 347 U (51) Int. Cl.
*F16L 11/118* (2006.01)
(52) U.S. Cl. .................. 285/82; 285/154.4; 174/59
(58) Field of Classification Search ............. 285/139.1, 285/139.2, 139.3, 140.1, 189, 194, 203, 204, 285/205, 322, 82, 89, 92, 154.4, 243; 411/326, 411/949; 24/457, 458; 174/59
See application file for complete search history.

(56) References Cited

U.S. PATENT DOCUMENTS

| 2,894,768 | A | * | 7/1959 | Davis ........................ 285/39 |
| 3,139,768 | A | * | 7/1964 | Biesecker ................. 74/502.4 |
| 3,654,382 | A | * | 4/1972 | Rubright ................. 174/153 G |
| 3,659,880 | A | * | 5/1972 | Goldsobel ............... 285/149.1 |
| 4,767,135 | A | * | 8/1988 | Holzmann ................... 285/27 |
| 5,068,496 | A | * | 11/1991 | Favalora .................... 174/654 |
| 5,072,072 | A | * | 12/1991 | Bawa et al. .............. 174/655 |
| 5,626,493 | A | * | 5/1997 | Post et al. .................. 439/555 |

(Continued)

FOREIGN PATENT DOCUMENTS

AT    409 049    5/2002

(Continued)

*Primary Examiner*—James M. Hewitt
(74) *Attorney, Agent, or Firm*—Volpe And Koenig P.C.

(57) ABSTRACT

A connector fitting for fixing a longitudinal body, for example, a cable, a hose, a pipe, a corrugated hose to a wall opening. The connector fitting includes a chuck, which penetrates the opening and includes slits that extend in an axial direction. The chuck is radially outwardly expandable, in an insertion direction behind the opening into a clamping region containing the slits, and can be tightened on an outer side or in front of the opening of the housing by the thread and a matching tensioning nut, such that the clamping region can be withdrawn into the opening and thus braced against the longitudinal body. The tensioning nut includes an abutment acting in the axial direction and the chuck comprises a counter-abutment adjacent to its thread section, and the counter-abutment exerts pressure on the abutment in a released position of the chuck.

16 Claims, 7 Drawing Sheets

U.S. PATENT DOCUMENTS

| | | |
|---|---|---|
| 6,179,340 B1 | 1/2001 | Adolf et al. |
| 6,394,690 B1 | 5/2002 | Bartholomä et al. |
| 6,511,099 B2 * | 1/2003 | Bartholoma et al. ..... 285/140.1 |
| 6,722,704 B2 * | 4/2004 | Bartholoma et al. ..... 285/140.1 |
| 2002/0006309 A1 * | 1/2002 | Bartholoma et al. ........ 403/194 |

FOREIGN PATENT DOCUMENTS

| | | |
|---|---|---|
| DE | 100 33 911 | 1/2002 |
| EP | 0 923 177 | 6/1999 |

* cited by examiner

CONNECTOR FITTING

BACKGROUND

The invention relates to a connector fitting for fixing a longitudinal body, for example, a cable, a hose, a pipe, a corrugated hose, or the like, to an opening, especially to an opening or a perforation in a housing wall. The connector fitting comprises a chuck, which penetrates the opening in a position of use and is provided with slits that extend essentially in the axial direction, said chuck comprising a thread located on a section, which is arranged and remains in front of the opening. According to the invention, the chuck radially expands outwards in the insertion direction behind the opening into a clamping region containing slits, and can be tightened on the outer side or in front of the opening of the housing by means of the thread and a matching tensioning nut, such that the clamping region can be directly or indirectly, at least partially, withdrawn into the opening and thus can be braced against the longitudinal body.

A connector fitting of this type is known from DE 100 33 911 C1, FIGS. 6-8, and has proven itself in practice. In this way, the tensioning nut can act directly on a connecting piece of the chuck and can tighten the chuck on one hand but can also move it back axially into the released position by rotating in the opposite direction. Thus, the longitudinal body can also be released again.

If this disassembly is not performed with care and the tensioning nut is turned too far into the open position, the chuck leaves the internal thread of the tensioning nut, so that the entire arrangement then falls apart or must be reassembled from the inside of a housing for later assembly.

SUMMARY

Therefore, there is the objective of creating a connector fitting of the type mentioned in the introduction, which can prevent the undesired total disassembly of the chuck and tensioning nut.

To achieve this objective, the tensioning nut comprises an abutment that acts in the axial direction and the chuck comprises a counter-abutment adjacent to its threaded section. The counter-abutment acts on the abutment in the released position of the chuck.

If such a connector fitting is screwed in the opening or releasing direction, the chuck cannot leave the thread of the tensioning nut due to the abutment and the counter-abutment, thus these parts cannot be completely separated because before such a separation can occur, the abutment and counter-abutment contact each other and prevent further screw motion in the releasing direction.

Here, it is advantageous if the chuck covers the abutment of the tensioning nut in the axial direction with the region bearing the counter-abutment on the side facing away from the housing. Through this arrangement of abutment and counter-abutment, the connector fitting remains on the side of the housing opposite the tensioning region of the chuck when the chuck is loosened in the perforation without coming apart or falling out.

Here, it is especially advantageous if the tensioning nut comprises a sleeve-like extension adjacent to its thread in the axial direction. The radially inwardly projecting abutment is arranged within this extension. Therefore, the counter-abutment remains protected.

The abutment can be arranged at the end of the internal thread of the tensioning nut between the thread region and the sleeve-like extension. Therefore, the sleeve-like extension surrounds and protects the thread of the chuck also in the tightened position of use.

Here, the axial dimension of the sleeve-like extension can be at least as large as the axial adjustment path for tightening the chuck, or larger, and the counter-abutment located on the chuck can also be arranged within the sleeve-like extension for a tightened tensioning screw or tensioning nut. Thus, the thread of the tensioning screw and the counter-abutment is still protected by the sleeve-like extension in the position of use even for the greatest adjustment of the tensioning screw, e.g., on an opening in a relatively thin wall.

In one advantageous configuration of the invention, the counter-abutment is arranged on the end of the chuck facing away from the tensioning region and is an annular piece, which is connected to the chuck and axially covers the abutment of the tensioning nut in the position of use, said annular piece extending over at least a part of the circumference of the chuck and the abutment. Through this large contact surface, a good force distribution is achieved for the mutual contact of abutment and counter-abutment.

The counter-abutment embodied as an annular piece can be connected integrally to the chuck or can be a separate part, especially a sealing ring or O-ring, inserted into a groove at the end of the chuck. An integral abutment is stable and does not require complicated molds for injection-molding fabrication. Here, the chuck can be screwed in from the side of the sleeve-like extension into the tensioning nut. In this way, the tensioning region of the chuck is pressed together by the abutment and the attached internal thread guides the tensioning nut and then is screwed in further. If the abutment is a separate part located in a groove, the chuck can also be mounted from the side facing away from the sleeve-like extension if the abutment is first inserted into the groove for a mounted chuck. Furthermore, the shape and material of the abutment can vary according to the application of the connector fitting.

In one especially advantageous configuration of the invention, which prevents rotation of the tensioning nut not only by mutual axial contact of abutment and counter-abutment, the counter-abutment on the chuck comprises at least one finger extending radially outwardly, especially particularly, projecting tangentially. The tensioning nut is covered by it in a position of use, with a projection extending in the axial direction, which contacts the finger in the circumferential direction for blocking rotational movement.

The counter-abutment formed as a finger can be elastic and can be deflected elastically for contact on the abutment projection up to the inner wall of the sleeve-like extension in order to cushion the transition from rotational motion to the blocked position.

The somewhat elastic abutment finger further has the advantage that in a typical way the chuck can be inserted with its end region into the nut, wherein only the abutment finger has to be bent inwards somewhat elastically to be able to be led through the thread and the abutment. Here, the orientation and curvature of this abutment finger is favorable for rotating the chuck in the tensioning nut. Thus, a chuck can be used with a very large radial dimension of the tensioning region or the tensioning finger, which could not be introduced from the other side through the abutment and the thread of the coupling ring or tensioning nut. This arrangement thus allows nearly any sized radial chuck expansion of its tensioning region.

The finger used as a counter-abutment and extending diagonally or tangentially can stand apart from the chuck against the relative rotational motion of the external thread.

In this way, for relative screwing in the releasing direction, the abutment finger initially at a distance from the abutment on the tensioning nut comes increasingly closer to this finger and then reaches the axially extending projection against the rotation of the tensioning nut.

The projection extending in the axial direction opposite the abutment can be arranged at a diameter, which is smaller than the diameter of the circle, on which the outer, free end of the abutment finger is located. Through this arrangement, the abutment finger is expanded and spread apart and correspondingly securely fixed. Simultaneously, its radial coverage of the abutment of the tensioning nut increases, so that a separation of the chuck from the tensioning nut by a screwing motion in the releasing direction is practically excluded.

In one especially advantageous configuration of the axially extending projection, the abutment side of the projection extends at a steep angle, especially approximately axially, and the limit of the projection facing away from the abutment side is at a rising, diagonal slope. Through the steep edge of the projection, the abutment finger is held during the releasing of the tensioning nut or during the disassembly of the connector fitting and the tensioning nut is prevented from falling out. If the connector fitting is mounted, the abutment finger can slide slightly over the diagonal edge of the projection during turning of the chuck in the tensioning nut and is slightly mechanically loaded by the resulting deflection.

It is also advantageous if a similarly slotted connecting piece, which can be expanded by the chuck and engages behind the perforation on the inside with retaining projections, is arranged on the outer side of the chuck between the chuck and the perforation edge. The inside of this connecting piece can receive force from the outer side of the chuck. The individual retaining projections of the connecting piece are used to securely fix the connector fitting to the housing wall, wherein the retaining projections connect rigidly to the inside of the housing wall.

In addition to the internal thread for tightening the screwed-on chuck, the lower part of the tensioning nut comprises another internal thread with greater radius than that of the chuck. This other thread is used for fixing the connecting piece. For adapting to various wall thickness values, the entire tensioning nut is turned for tightening until there is contact of the retaining projections of the connecting piece on the inside as well as the tensioning nut on the outer side of the housing. As soon as the tensioning nut is rigidly attached to the housing wall, only the top part of the tensioning nut, thus the sleeve-like extension, is turned and thus the chuck is braced against the longitudinal body. Between the upper and lower parts of the tensioning nut, a slip coupling can be connected, on which the upper part of the tensioning nut slides after the tightening of the lower part for further tightening of the chuck.

For the fast tightening of the chuck with the longitudinal body, in one advantageous configuration of the connector fitting, at least one of the clamping fingers of the chuck comprises a pushing element formed on the outside, said pushing element preventing co-rotation of the chuck with the tensioning nut through intermeshing with the slots of the connecting piece when the tensioning nut is tightened. The frictional engagement by the force of the inside of the connecting piece through the outer side of the chuck is supported by a positive fit.

The opening of the sleeve-like extension can be closed by a seal, which comprises an opening for the longitudinal body, advantageously on the side facing away from the housing. Therefore, the interior of the connector fitting can be protected against moisture and/or dust. According to the configuration, the seal can also fulfill the function of bending protection for the longitudinal body.

BRIEF DESCRIPTION OF THE DRAWINGS

In the following, embodiments of the invention are described in more detail with reference to the drawing. Shown in partially schematic representation are.

DETAILED DESCRIPTION OF THE PREFERRED EMBODIMENTS

A connector fitting designated in its entirety with 1 for fixing a longitudinal body, e.g., a cable, a hose, a pipe, a corrugated hose, or the like, to an opening, especially to an opening or to a perforation in a housing wall, comprises a chuck 2, which comprises a thread on a section that is arranged and remains in front of the opening and expands radially outwards in the insertion direction behind the opening into a clamping region containing slits extending in the axial direction.

The chuck 2 can be tightened by means of the thread and a matching tensioning nut 3 in front of the housing opening, so that the clamping region can be withdrawn into the opening and therefore can be braced against the longitudinal body, with the external thread of the chuck 2 engaging an internal thread of the tensioning nut 3.

To prevent an undesired total disassembly of the chuck 2 and tensioning nut 3, the chuck 3 comprises an abutment 4a, 4b acting in the axial direction, and the tensioning nut 2 comprises a counter-abutment 5a, 5b, 5c, 5d adjacent to its thread section. The counter-abutment 5a, 5b, 5c, 5d exerts pressure on the abutment 4a, 4b in the released position of the chuck 2 and therefore prevents the chuck 2 from being able to leave the thread of the tensioning nut 3 or from being able to separate from the tensioning nut 3.

Figure 1:
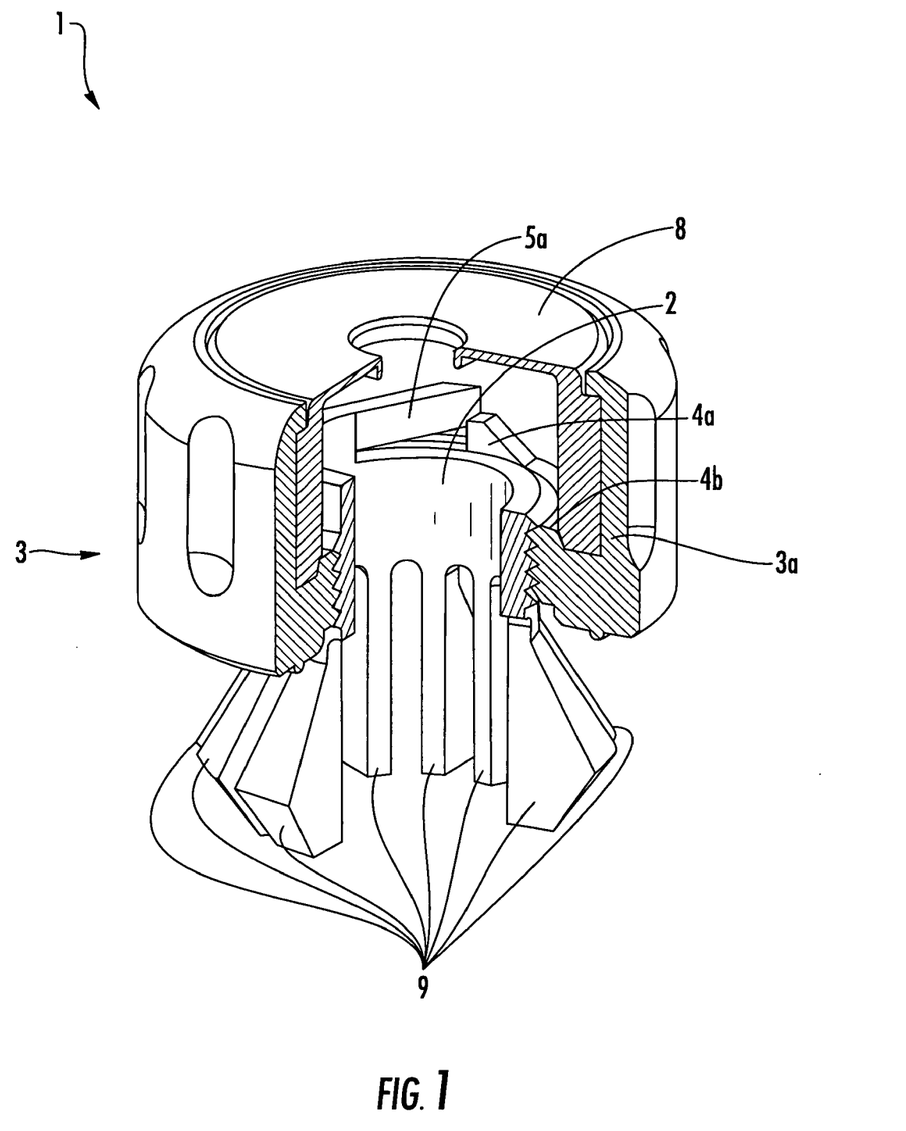
FIG. 1 is a sectional view of a connector fitting according to the invention in the assembled state with a chuck, whose tensioning region in the position of use can engage behind a perforation with an expanded outer side and which comprises on the outer end as a counter-abutment a projecting finger for covering an annular end surface as an abutment and for interacting with an abutment projection extending axially from this surface.

In the embodiment of FIG. 1, the connector fitting according to the invention comprises on the end of the internal thread 4b of the tensioning nut 3, which forms an annular end surface, facing away from the tensioning region of the chuck 2, an axial projection 4a, which acts as an abutment and which comprises in this embodiment a steeply rising, axially extending abutment side. The side of the projection 4a facing away from the abutment side rises diagonally.

The tensioning nut 3 comprises adjacent to the end of its internal thread in the axial direction a sleeve-like extension 3a, within which the projection 4a is arranged and which in the axial direction is as large as the axial displacement path when the chuck 2 is tightened or larger, so that a counter-abutment 5a located on the chuck 2 is also arranged within the sleeve-like extension 3a for a tightened tensioning screw 2 or tensioning nut 3.

At the upper end of the chuck 2, there is a tangentially projecting finger 5a, which is used as a counter-abutment and which stands at a distance from this opposite the relative rotational direction of external thread of the chuck 2 and which exerts pressure on the projection 4a as well as the annular end surface of the tensioning nut 3 forming the end of the internal thread 4b in the axial direction on the side facing away from the housing in the released position of the chuck 2 and thus prevents the further rotational movement of the chuck 2. The external free end of the finger 5a is here located on a circle, whose diameter is greater than the diameter of the annular end surface, on which the projection 4a is arranged. When the projection 4a is contacted, the elastic finger 5a deflects elastically up to the inner wall of the sleeve-like extension 3a.

The chuck 2 comprises at its tensioning region several radially outwardly expanding clamping fingers 9, which are bent inwards for tightening with a longitudinal body through the tensioning nut 3 by the contact on the perforation edge for the fixing of the connector fitting on an opening or a perforation 50 of a housing wall 40 or on the lower end of the internal thread of the tensioning nut 3 and thus fixes the longitudinal body. When braced against the longitudinal body, the chuck 2 with-draws partially into the thread opening through screwing in the thread of the tensioning nut 3. A seal 8, through which the longitudinal body is guided, closes the tensioning nut 3 on the upper end.

Figure 2:
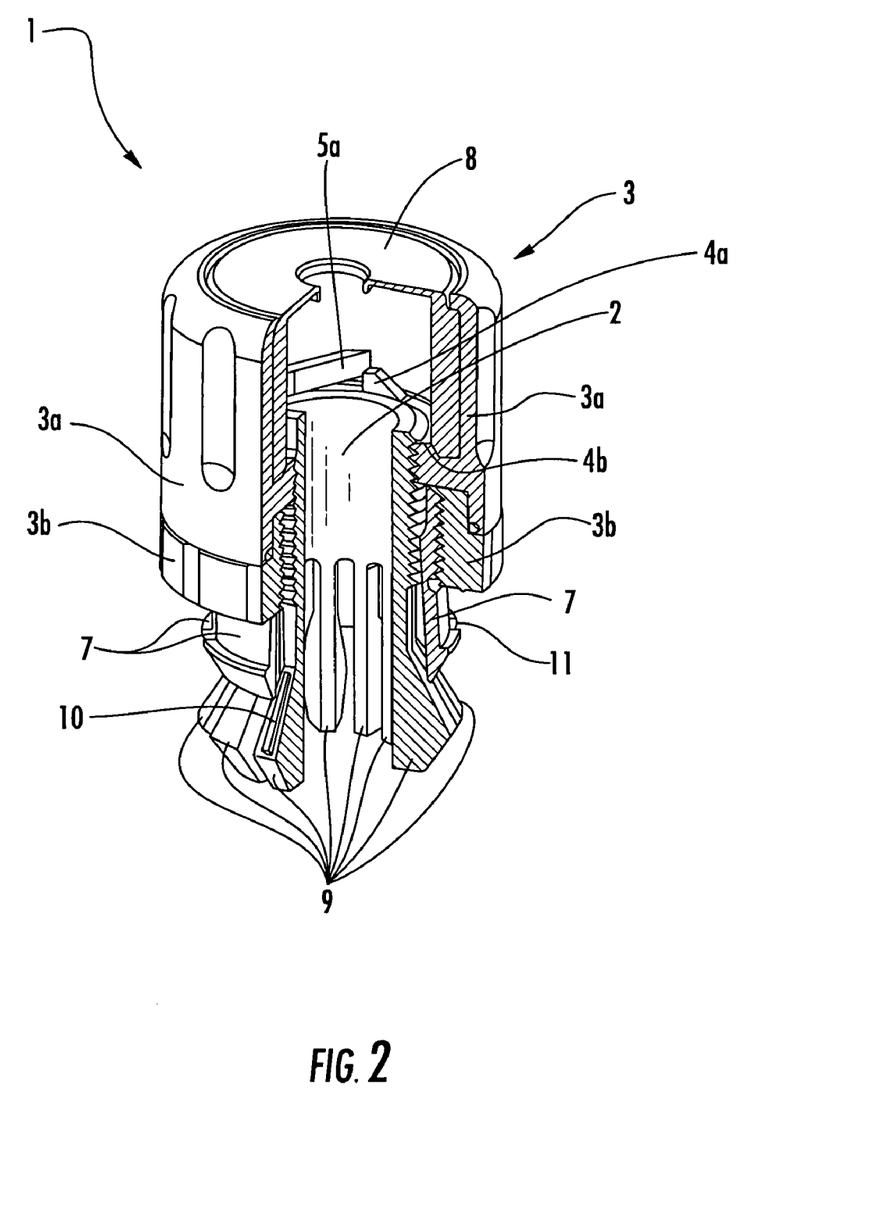
FIG. 2 is a sectional view of a connector fitting according to the invention in the assembled state with abutment finger and axial projection, wherein on the outer side of the chuck an expandable connecting piece with retaining projections for engaging behind a perforation is arranged.
Figure 3:
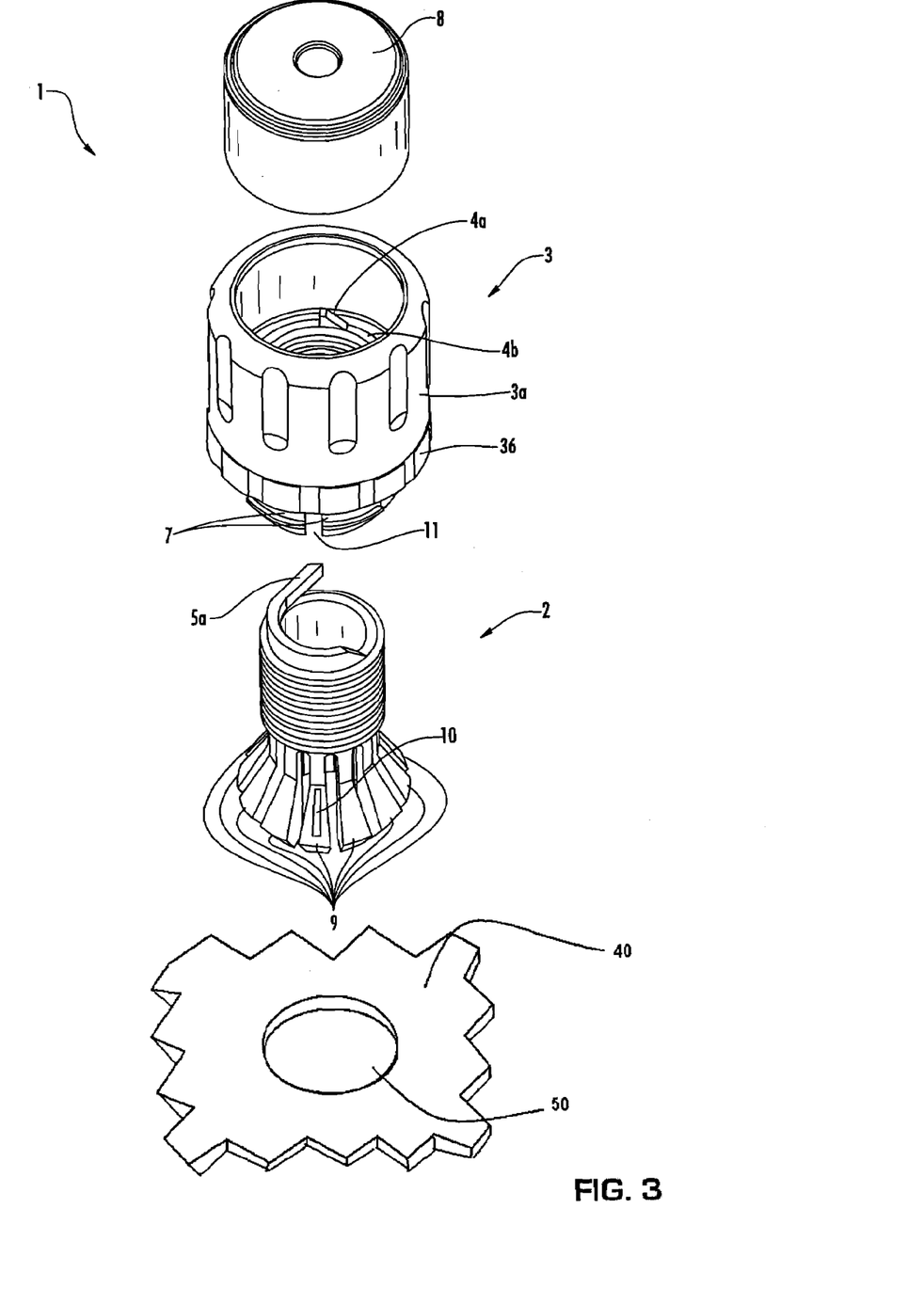
FIG. 3 is an exploded view of the connector fitting according to FIG. 2.

In the embodiment shown in FIGS. 2 and 3 and modified from FIG. 1, the connector fitting 1 according to the invention comprises a tensioning nut 3. This tensioning nut 3 consists of a sleeve-like extension 3a and a screw ring 3b. The sleeve-like extension 3a comprises an internal thread, in which the external thread of the chuck 2 engages.

Similar to FIG. 1, the chuck 2 comprises on the upper end a tangentially projecting finger 5a, which is used as a counter-abutment and which stands at a distance from this opposite the relative rotational direction of the external thread of the chuck 2 and which exerts pressure on the projection 4a as well as the annular end surface of the tensioning nut 3 forming the end of the internal thread 4b in the axial direction on the side facing away from the housing in the released position of the chuck 2, and thus prevents the further rotational movement of the chuck 2.

To adapt to various wall thickness values, a connecting piece 7 provided with slits 11 and engaging behind the perforation on the inside with retaining projections 7a is screwed in from below in an internal thread of the screw ring 3b, which is arranged in the position of use on the outer side of the chuck 2 between this and the perforation edge. Force is exerted on the inside of the connecting piece 7 by the outside of the clamping finger 9 of the chuck 2. At least one of the clamping fingers 9 is provided with a pushing element 10, which is arranged on the outer side and which engages in the slits 11 of the connecting piece 7 in the position of use.

The assembly of the chuck 2, tensioning nut 3, and seal 8, which can be seen in FIG. 3, is realized according to the illustration from below upwards, wherein the elastic finger 5a of the chuck 2 is bent so far inwards that it fits through the internal thread of the tensioning nut 3. After the chuck 2 is screwed into the tensioning nut 3, the finger 5a automatically bends outward again and can therefore be used again as a counter-abutment of the chuck 2.

Figure 4:
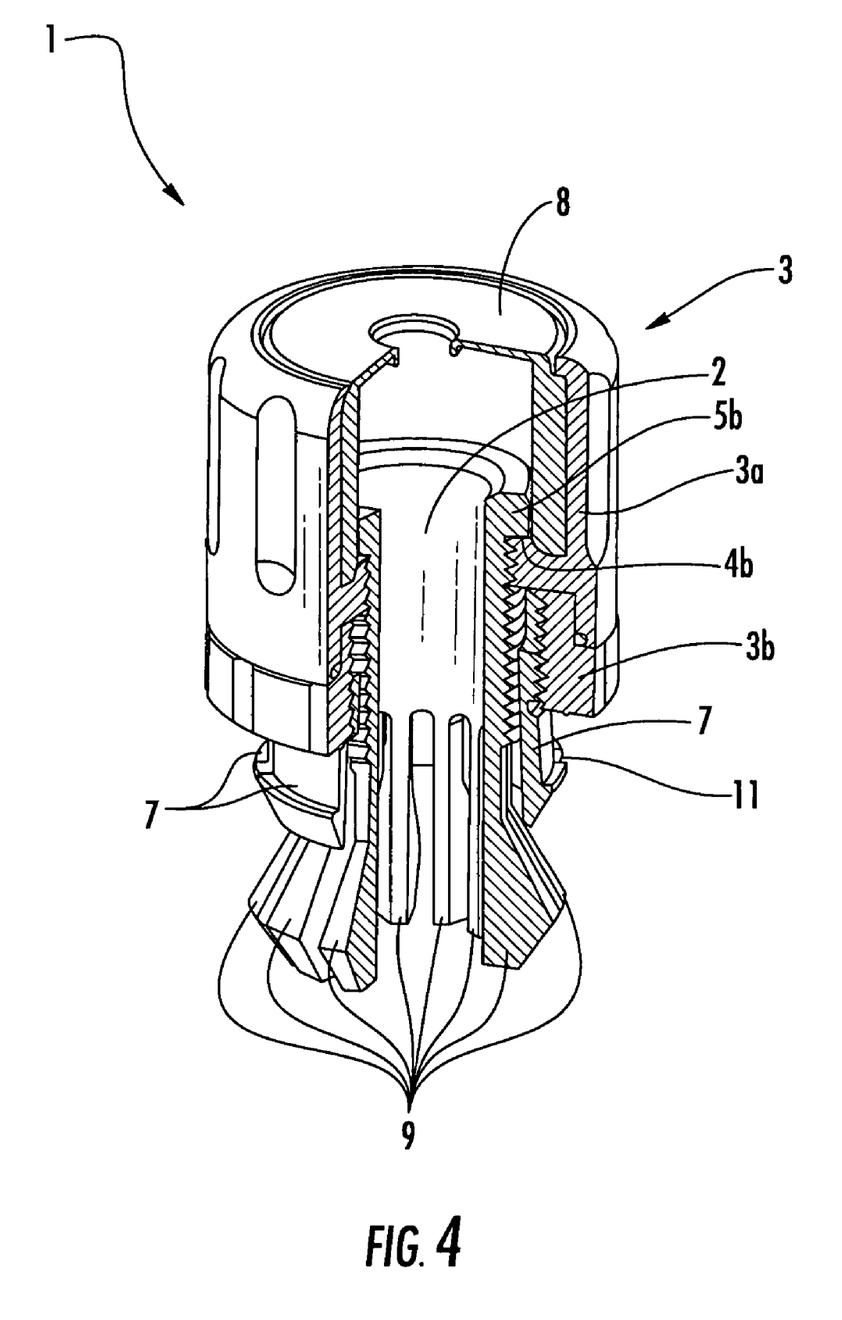
FIG. 4 is a sectional view of a connector fitting according to the invention in the assembled state with an axial annular element as a counter-abutment on the chuck.
Figure 5:
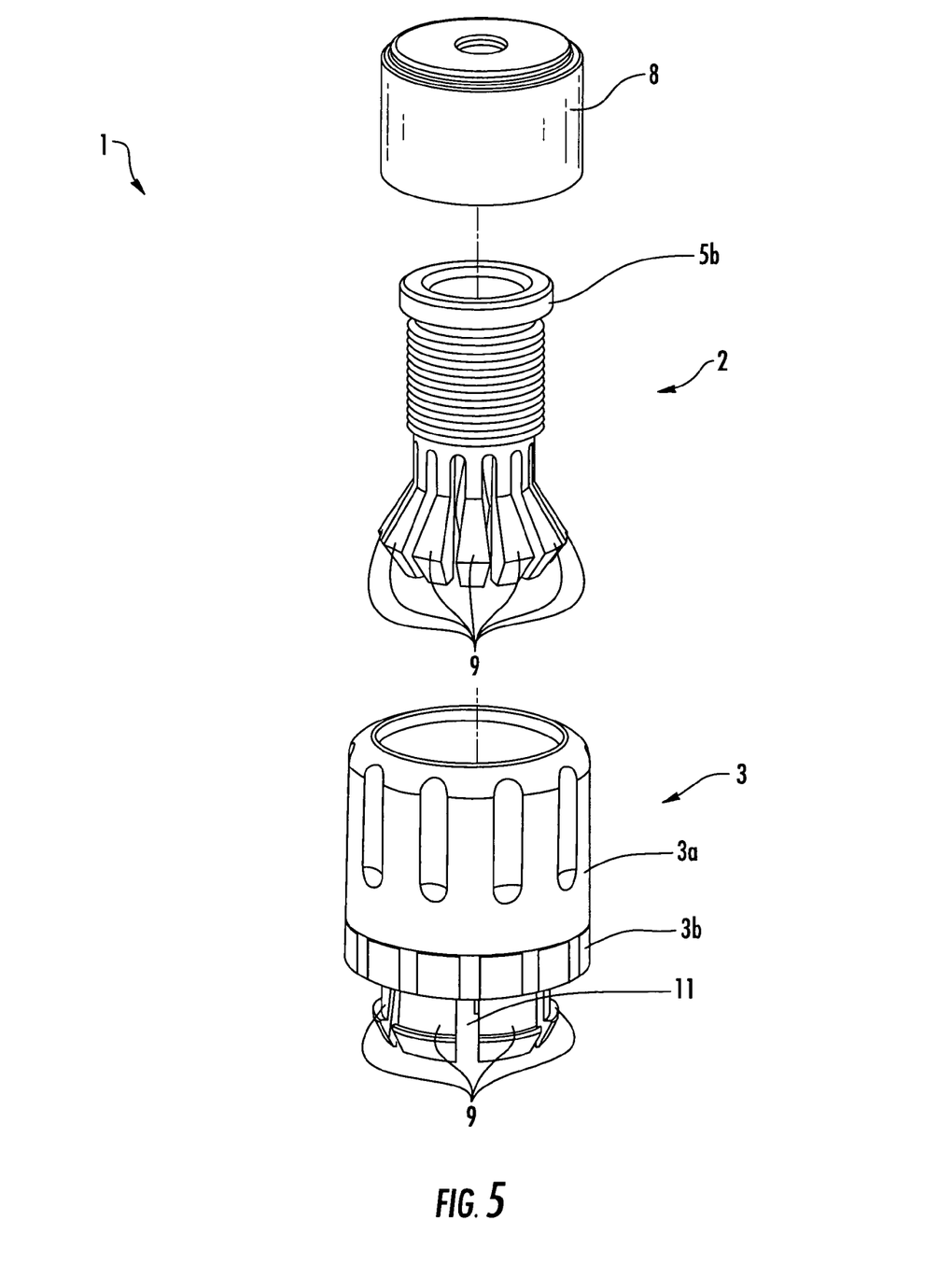
FIG. 5 is an exploded view of the connector fitting according to FIG. 4.

FIGS. 4 and 5 show another embodiment of the connector fitting 1 according to FIGS. 2 and 3, for which the annular end surface of the end of the internal thread 4b of the tensioning nut 3 is provided as the abutment in the interior of the sleeve-like extension 3a of the tensioning nut 3. An annular piece 5b, which is formed on the end of the external thread of the chuck 2 and which surrounds and axially covers the abutment 4b, forms the counter-abutment on the chuck 2. This annular piece exerts pressure on the abutment 4b in the released position of the chuck 2. The assembly of the chuck 2, tensioning nut 3, and seal 8, which can be seen in FIG. 5, is realized from top downwards according to the illustration.

Figure 6:
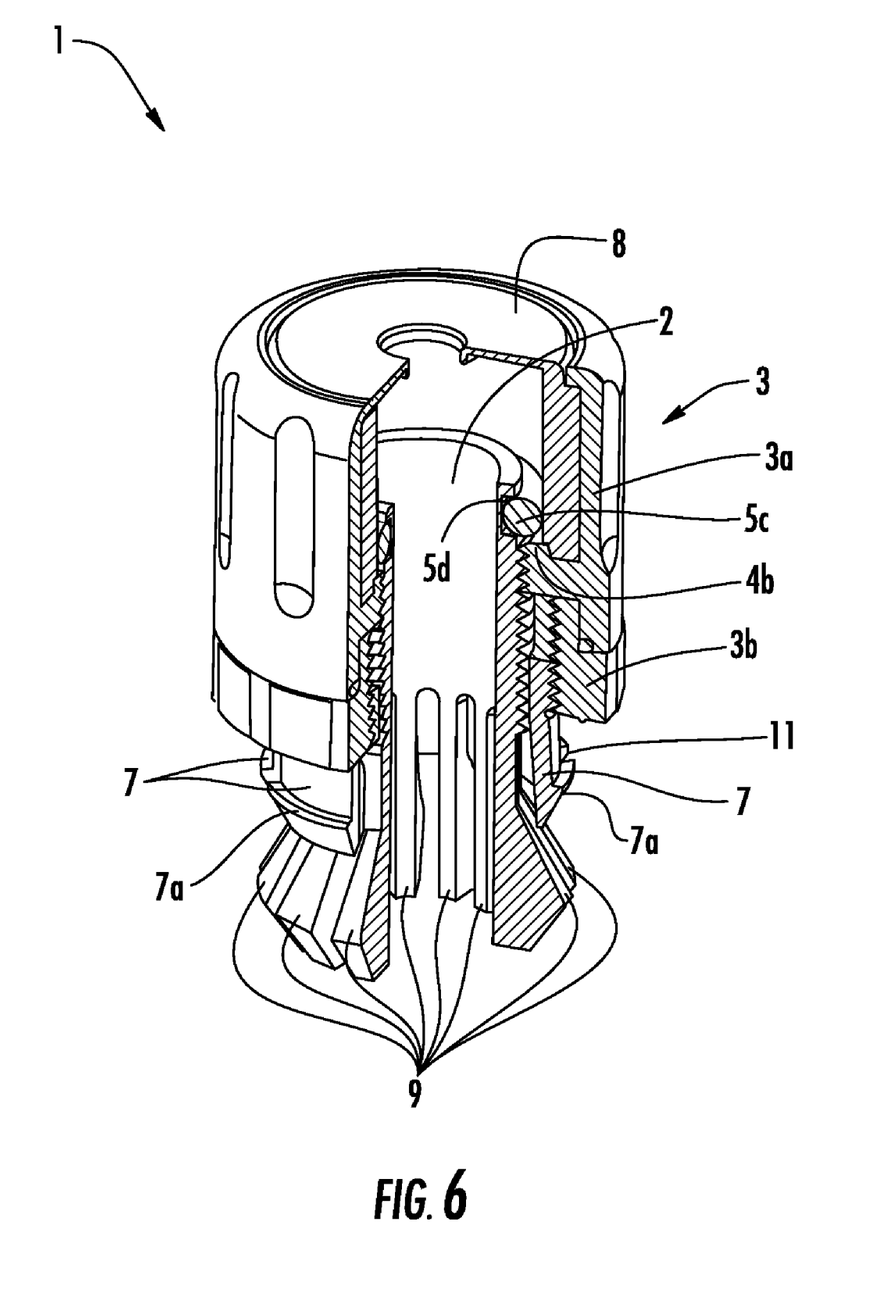
FIG. 6 is a section view of a connector fitting according to the invention in the assembled state with a sealing ring acting as a counter-abutment in a groove on the end of the thread of the chuck.
Figure 7:
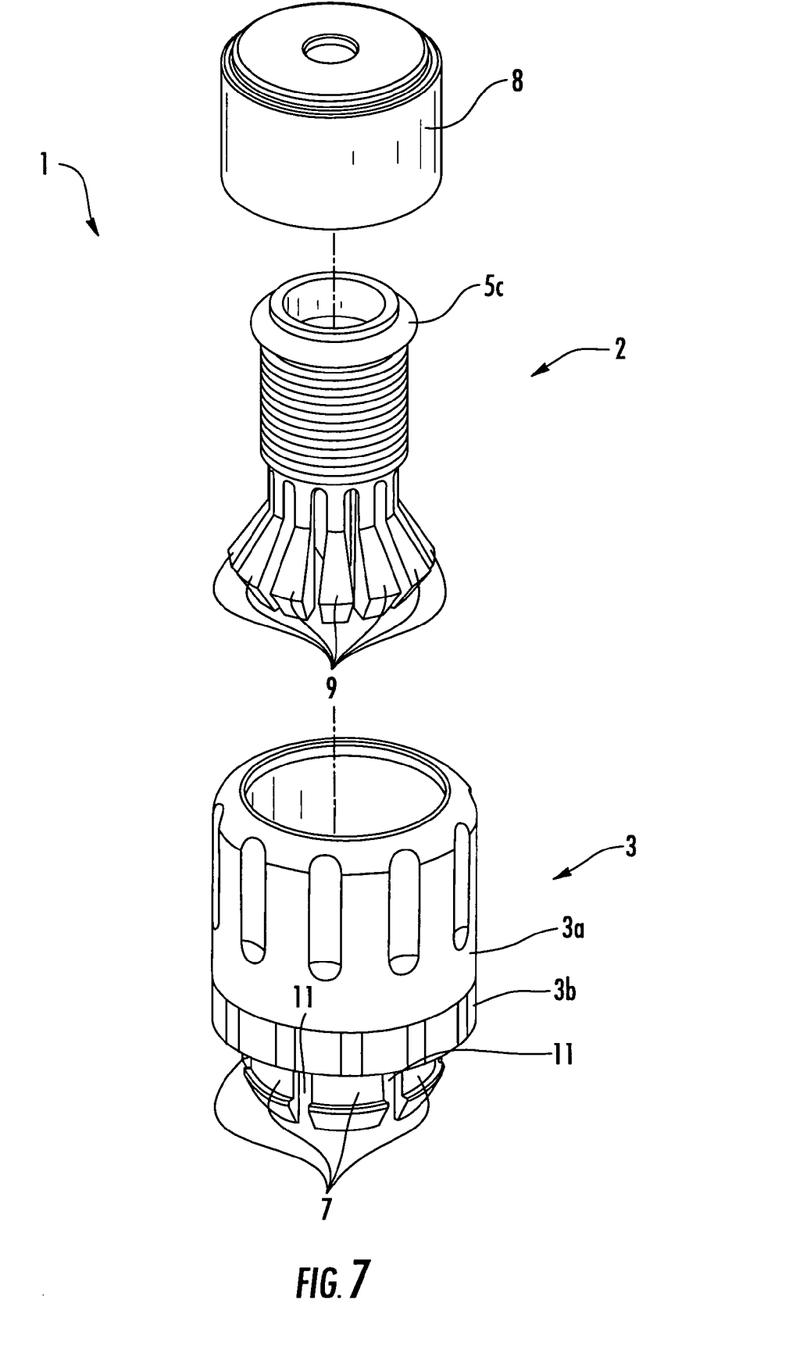
FIG. 7 is an exploded view of the connector fitting according to FIG. 6.

The modification of the embodiment from FIGS. 4 and 5 of the connector fitting 1, which can be seen in FIGS. 6 and 7, comprises as the abutment in the interior of the sleeve-like extension 3a of the tensioning nut 3 the annular end surface of the end of the internal thread 4b of the tensioning nut 3. A ring, in this embodiment an O-ring 5c, which is inserted into a groove 5d, forms the counter-abutment to the chuck 2. This ring exerts pressure on the abutment 4b in the released position of the chuck 2. The O-ring 5c realizes a sealing effect in the position of use through the contact on the end of the internal thread of the tensioning nut 3 forming an annular end surface and thus fulfills a double function, on one hand, as a counter-abutment of the chuck 2, and on the other hand, as a seal between the chuck 2 and tensioning nut 3.

The assembly of the chuck 2, tensioning nut 3, and seal 8, which can be seen in FIG. 7, is realized from the top downwards according to the illustration.

The invention claimed is:

1. Connector fitting (1) for fixing a longitudinal body to an opening in a wall, wherein the connector fitting (1) comprises:
   a chuck (2), which penetrates the opening in a position of use and is provided with slits that extend generally in an axial direction, said chuck comprising a thread located on a section, the section adapted to be arranged and remain in front of the wall opening, wherein the chuck is capable of radially expanding outwards in an insertion direction behind the wall opening into a clamping region containing the slits, and can be tightened on an outer side or in front of the opening of the wall by the thread; and
   a matching tensioning nut (3), such that the clamping region can be directly or indirectly, at least partially, withdrawn into the opening and thus braced against the longitudinal body, wherein the tensioning nut (3) comprises:
   a radially inwardly extending abutment (4a, 4b) extending in the axial direction and the chuck (2) comprises a counter-abutment (5a, 5b, 5c, 5d) adjacent to the thread section and the counter-abutment (5a, 5b, 5c, 5d) exerts pressure on the abutment (4a, 4b) in a released position of the chuck (2); and a sleeve-like extension (3a) located adjacent the thread section and extending in the axial direction, within which the radially inwardly extending abutment (4a, 4b) is arranged.

2. Connector fitting according to claim 1, wherein a region of the chuck (2) bearing the counter-abutment (5a, 5b, 5c, 5d) projects the abutment (4a, 4b) of the tensioning nut (3) in the axial direction on a side facing away from the wall.

3. Connector fitting according to claim 1, wherein the abutment (4a, 4b) is arranged at an end of an internal thread of the tensioning nut (3) between the thread section and the sleeve-like extension (3a).

4. Connector fitting according to claim 1, wherein an axial dimension of the sleeve-like extension (3a) is at least as large as an axial displacement path when the chuck (2) is tightened or larger.

5. Connector fitting according to claim 1, wherein the counter-abutment is arranged on an end of the chuck (2) facing away from a tensioning region and is an annular piece (5b), which is connected to the chuck and which overlaps the abutment (4b) of the tensioning nut (3) in a position of use, said annular piece extending over at least a part of a circumference of the chuck (2) and the abutment (4b).

6. Connector fitting according to claim 5, wherein the counter-abutment formed as the annular piece (5b) is connected integrally with the chuck (2) or as a separate part, inserted into a groove (5d) at an end of the chuck (2).

7. Connector fitting according to claim 1, wherein the counter-abutment on the chuck (2) comprises at least one finger (5a) extending radially over an outer circumference thereof and projecting tangentially and wherein on the abutment (4b) of the tensioning nut (3) covering the chuck in use, a projection (4a) is provided extending in the axial direction, said projection contacting the finger (5a) in a circumferential direction for blocking rotational motion.

8. Connector fitting according to claim 1, wherein projection (4a) extends opposite the abutment in the axial direction is and arranged on an annular end surface of the chuck, the annular end surface having a diameter, which is smaller than a diameter of an annular end surface on which an outer free end of abutment finger (5a) is located.

9. Connector fitting according to claim 1, wherein a contact side of projection (4a) extends substantially axially, and a border of the projection (4a) facing away from the contact side extends diagonally.

10. Connector fitting according to claim 1, wherein an opening of the sleeve-like extension (3a) is partially closed on a side facing away from the wall by a seal (8), which comprises an opening for the longitudinal body.

11. Connector fitting, for fixing a longitudinal body to an opening in a wall, wherein the connector fitting (1) comprises:
a chuck (2), which penetrates the opening in a position of use and is provided with slits that extend generally in an axial direction, said chuck comprising a thread located on a section, the section adapted to be arranged and remain in front of the wall opening, wherein the chuck is capable of radially expanding outwards in an insertion direction behind the wall opening into a clamping region containing the slits, and can be tightened on an outer side or in front of the opening of the wall by the thread; and
a matching tensioning nut (3), such that the clamping region can be directly or indirectly, at least partially, withdrawn into the opening and thus braced against the longitudinal body, wherein the tensioning nut (3) comprises:
an abutment (4a, 4b) extending in the axial direction and the chuck (2) comprises a counter-abutment (5a, 5b, 5c, 5d) adjacent to the thread section and the counter-abutment (5a, 5b, 5c, 5d) exerts pressure on the abutment (4a, 4b) in a released position of the chuck (2); and wherein the counter-abutment is formed as a finger (5a) that is elastic and can be deflected for contact with the abutment projection (4a) elastically up to an inner wall of a sleeve-like extension (3a) located adjacent the thread section.

12. Connector fitting according to claim 11, wherein the finger (5a) is used as the counter-abutment and extends diagonally or tangentially against a relative rotational direction of the thread section of the chuck (2).

13. Connector fitting according to claim 1, for fixing a longitudinal body to an opening in a wall, wherein the connector fitting (1) comprises:
a chuck (2), which penetrates the opening in a position of use and is provided with slits that extend generally in an axial direction, said chuck comprising a thread located on a section, the section adapted to be arranged and remain in front of the wall opening, wherein the chuck is capable of radially expanding outwards in an insertion direction behind the wall opening into a clamping region containing the slits, and can be tightened on an outer side or in front of the opening of the wall by the thread; and
a matching tensioning nut (3), such that the clamping region can be directly or indirectly, at least partially, withdrawn into the opening and thus braced against the longitudinal body, wherein the tensioning nut (3) comprises:
an abutment (4a, 4b) extending in the axial direction and the chuck (2) comprises a counter-abutment (5a, 5b, 5c, 5d) adjacent to the thread section and the counter-abutment (5a, 5b, 5c, 5d) exerts pressure on the abutment (4a, 4b) in a released position of the chuck (2), wherein between the chuck (2) and a wall opening edge there is a slotted connecting piece (7), which can be expanded by the chuck (2) and which engages behind the opening on an inside with retaining projections (7a), where force can be exerted on an inside of the connecting piece by an outer side of the chuck (2).

14. Connector fitting according to claim 13, wherein the connecting piece (7) engageable behind the opening on the inside with retaining projections (7a) and is connected to the tensioning nut (3) by screw connection for adapting to various wall thickness values.

15. Connector fitting, for fixing a longitudinal body to an opening in a wall, wherein the connector fitting (1) comprises:
a chuck (2), which penetrates the opening in a position of use and is provided with slits that extend generally in an axial direction, said chuck comprising a thread located on a section, the section adapted to be arranged and remain in front of the wall opening, wherein the chuck is capable of radially expanding outwards in an insertion direction behind the wall opening into a clamping region containing the slits, and can be tightened on an outer side or in front of the opening of the wall by the thread; and
a matching tensioning nut (3), such that the clamping region can be directly or indirectly, at least partially, withdrawn into the opening and thus braced against the longitudinal body, wherein the tensioning nut (3) comprises:

an abutment (4a, 4b) extending in the axial direction and the chuck (2) comprises a counter-abutment (5a, 5b, 5c, 5d) adjacent to the thread section and the counter-abutment (5a, 5b, 5c, 5d) exerts pressure on the abutment (4a, 4b) in a released position of the chuck (2), wherein, the chuck includes clamping fingers and at least one of the clamping fingers (9) of the chuck (2) comprises a pushing element (10) formed on an outer side, said pushing element preventing co-rotation of the chuck (2) with the tensioning nut (3) through intermeshing with slits (11) of a connecting piece (7) when the chuck (2) is tightened.

16. Connector fitting (1) for fixing a longitudinal body to an opening, the connector fitting (1) comprises:

a chuck (2), which penetrates the opening in a position of use and is provided with slits that extend generally in an axial direction, said chuck comprising:

a thread located on a section, the section adapted to be arranged and remain in front of the wall opening, wherein the chuck is capable of radially expanding outwards in an insertion direction behind the wall opening into a clamping region containing the slits, and can be tightened on an outer side or in front of the opening of the wall by the thread; and a matching tensioning nut (3), such that the clamping region can be directly or indirectly, at least partially, withdrawn into the opening and thus braced against the longitudinal body, wherein the tensioning nut (3) comprises:

an abutment (4a, 4b) extending in the axial direction; and a sleeve-like extension (3a) located adjacent the thread section in the axial direction, within which the radially inwardly extending abutment (4a, 4b) is arranged and the chuck (2) comprises a counter-abutment (5a, 5b, 5c, 5d) adjacent to the thread section in a region of the chuck (2) that projects over the abutment (4a, 4b) of the tensioning nut (3) in the axial direction on a side facing away from the wall and the counter-abutment (5a, 5b, 5c, 5d) exerts pressure on the abutment (4a, 4b) in a released position of the chuck (2).

* * * * *